US012641373B2

(12) United States Patent
Wen et al.

(10) Patent No.: US 12,641,373 B2
(45) Date of Patent: May 26, 2026

(54) VOICE COIL STRUCTURE, METHOD FOR MANUFACTURING THE SAME, AND LOUDSPEAKER

(71) Applicant: TRANSOUND ELECTRONICS CO., LTD., New Taipei (TW)

(72) Inventors: Tseng-Feng Wen, New Taipei (TW); Chien-Kai Wen, New Taipei (TW); Chun-Han Huang, New Taipei (TW); Chung-Hsien Tseng, New Taipei (TW)

(73) Assignee: TRANSOUND ELECTRONICS CO., LTD., New Taipei (TW)

( * ) Notice: Subject to any disclaimer, the term of this patent is extended or adjusted under 35 U.S.C. 154(b) by 246 days.

(21) Appl. No.: 18/391,418

(22) Filed: Dec. 20, 2023

(65) Prior Publication Data

US 2025/0056162 A1 Feb. 13, 2025

(30) Foreign Application Priority Data

Aug. 9, 2023 (CN) ......................... 202311000102.9

(51) Int. Cl.
*H04R 9/04* (2006.01)
*H04R 9/06* (2006.01)

(52) U.S. Cl.
CPC ............... *H04R 9/047* (2013.01); *H04R 9/06* (2013.01)

(58) Field of Classification Search
CPC .............................. H04R 9/047; H01F 7/0289
See application file for complete search history.

(56) References Cited

U.S. PATENT DOCUMENTS

2018/0211775 A1* 7/2018 Salvatti .................... H04R 1/06

FOREIGN PATENT DOCUMENTS

| | | | |
|---|---|---|---|
| CN | 110278514 | A | 9/2019 |
| CN | 111586542 | A | 8/2020 |
| CN | 109148143 | B | 12/2021 |
| CN | 115955631 | A | 4/2023 |
| TW | 202226842 | A | 7/2022 |

* cited by examiner

*Primary Examiner* — Sunita Joshi
(74) *Attorney, Agent, or Firm* — ScienBiziP, P.C.

(57) ABSTRACT

The present disclosure provides a voice coil structure, a method for manufacturing the voice coil structure, and a loudspeaker. The voice coil structure includes a first insulation layer, a first wiring layer, a second insulation layer, at least one second wiring layer, and a third insulation layer. The second insulation layer extends to wiring gaps of the first wiring layer. The third insulation layer extends to wiring gaps of the at least one second wiring layer. Each of the first wiring layer and the at least one second wiring layer has a winding structure. The first wiring layer is electrically connected in series or in parallel with the at least one second wiring layer and forming two output terminals.

17 Claims, 11 Drawing Sheets

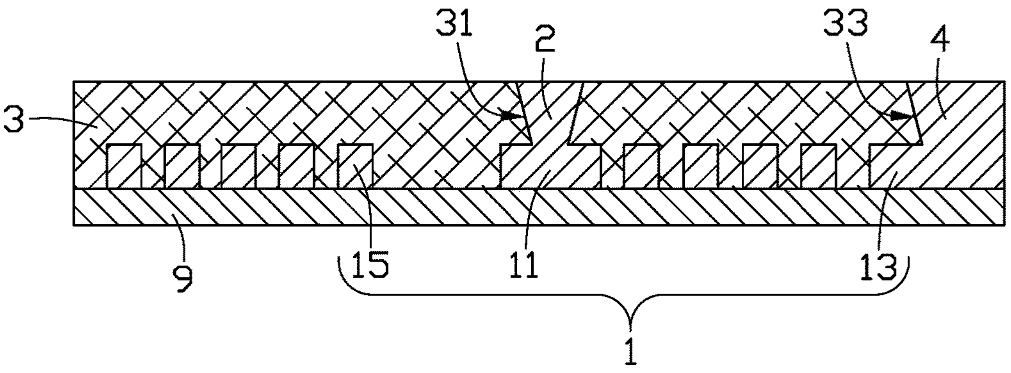

FIG. 9

Define a through hole and a notch on the second insulation layer, the first end be exposed from the through hole, and the second end be exposed from the notch — Block31

↓

Dispose a first conductor in the through hole and dispose a second conductor in the notch, the first conductor be electrically connected to the first end, and the second conductor be electrically connected to the second end — Block32

↓

Dispose the at least one second wiring layer and a connection pad isolated from the at least one second wiring layer on the second insulating layer, wherein the third end is electrically connected to the first conductor to form the detection end, the connection pad is electrically connected to the second conductor to form one of the two output terminals, and the fourth end forms another one of the two output terminals — Block33

FIG. 10

VOICE COIL STRUCTURE, METHOD FOR MANUFACTURING THE SAME, AND LOUDSPEAKER

FIELD

The subject matter relates to voice coil structures, and more particularly, to a voice coil structure, a method for manufacturing the voice coil structure, and a loudspeaker having the voice coil structure.

BACKGROUND

A loudspeaker is an energy exchanger that converts an electrical signal to an acoustic signal. The loudspeaker is an important acoustic component in an electronic device such as a computer or a mobile phone. The loudspeaker mainly includes a magnetic system and a diaphragm structure. The diaphragm structure includes a diaphragm and a voice coil disposed on the diaphragm. The magnetic system produces a magnetic field. When the magnitude or direction of an external current applied to the voice coil changes, the voice coil may vibrate, thereby allowing the loudspeaker to produce sound. However, such voice coil structure may have a large size, which cannot be used in a miniaturized loudspeaker. Furthermore, such voice coil structure may withstand low power capacity, which unable to meet a demand for high power capacity.

Therefore, there is room for improvement in the art.

SUMMARY

The present disclosure provides a manufacturing method of a voice coil structure, including: dispose a first wiring layer on a first insulating layer, the first wiring layer has a first winding structure; dispose a second insulating layer on the first wiring layer, cause the second insulation layer to extend to wring gaps of the first wiring layer; dispose at least one second wiring layer on the second insulating layer, each of the at least one second wiring layer has a second winding structure, the first wiring layer be electrically connected in series or in parallel with the at least one second wiring layer, the first wiring layer and the at least one second wiring layer form two output terminals; and dispose a third insulating layer on the at least one second wiring layer, cause the third insulating layer to extend to the wiring gaps of the at least one second wiring layer, the two output terminals expose from the third insulating layer.

The present disclosure further provides a voice coil structure, including a first insulation layer, a first wiring layer disposed on the first insulation layer, a second insulation layer disposed on the first wiring layer, at least one second wiring layer disposed on the second insulation layer, and a third insulation layer disposed on the second wiring layer. The second insulation layer extends to wring gaps of the first wiring layer, the first wiring layer is embedded in the second insulating layer. The third insulation layer extends to wring gaps of the second wiring layer, the second wiring layer is embedded in the third insulating layer. The first wiring layer has a first winding structure, and the second wiring layer also has a second winding structure. The first wiring layer is electrically connected in series or in parallel with the second wiring layer, the first wiring layer and the at least one second wiring layer form two output terminals. The two output terminals are exposed from the third insulating layer.

The present disclosure further provides a loudspeaker, including a diaphragm and the above-mentioned voice coil structure. A surface of the first insulation layer away from the first wiring layer is disposed on the diaphragm.

Other aspects and embodiments of the present disclosure are also expected. The above summary and the following detailed description are not intended to limit the present disclosure to any particular embodiment, but are merely intended to describe at least one embodiment of the present disclosure.

BRIEF DESCRIPTION OF THE DRAWINGS

Implementations of the present technology will now be described, by way of example only, with reference to the attached figures.

FIG. 9 is a diagrammatic view illustrating a second insulating layer being disposed on the first wiring layer in FIG. 7.

FIG. 10 is a sub-flowchart illustrating the method in FIG. 5.

DETAILED DESCRIPTION

Figure 1:
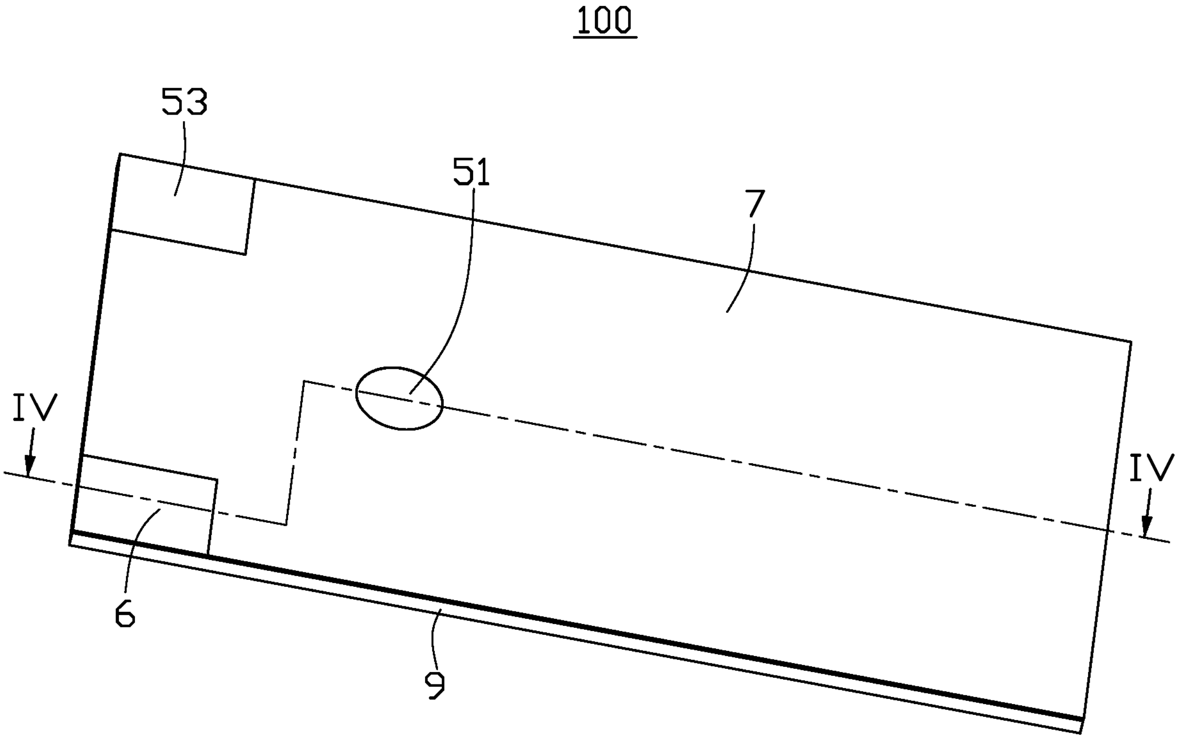
FIG. 1 is a diagrammatic view illustrating a voice coil structure according to an embodiment of the present disclosure.

Implementations of the present disclosure will now be described, by way of embodiments only, with reference to the drawings. The described embodiments are only at least one embodiment of the present disclosure, rather than all the embodiments.

It should be noted that when a component is referred to as being or "mounted on" another component, the component can be directly on another component or a middle component may exist therebetween. When a component is considered to be "disposed on" another component, the component can be directly on another component or a middle component may exist therebetween.

Unless otherwise defined, all technical terms used herein have the same meaning as commonly understood by one of ordinary skill in the art. The technical terms used herein are not to be considered as limiting the scope of the embodiments.

Referring to FIGS. 1 to 4, a voice coil structure 100 is provided according to an embodiment of the present disclosure. The voice coil structure 100 includes a first insulation layer 9, a first wiring layer 1 disposed on the first insulation layer 9, a second insulation layer 3 disposed on the first wiring layer 1, at least one second wiring layer 5 disposed on the second insulation layer 3, and a third insulation layer 7 disposed on the second wiring layer 5. The second insulation layer 3 extends to wiring gaps of the first wiring layer 1, so that the first wiring layer 1 is embedded in the second insulating layer 3. The third insulation layer 4 extends to wiring gaps of the second wiring layer 5, so that the second wiring layer 5 is embedded in the third insulating layer 4. The first wiring layer 1 has a first winding structure, and the second wiring layer 5 also has a second winding structure. The first wiring layer 1 is electrically connected in series or in parallel with the second wiring layer 5. The first wiring layer 1 and the at least one second wiring layer 5 can form two output terminals to connect to the positive pole and negative pole of the external power supply.

The two output terminals are exposed from the third insulating layer 7 and used for connecting to an external power supply such as by soldering, so that a current from the external power supply can be applied to the first wiring layer 1 and the second wiring layer 5. Under a magnetic field, the first wiring layer 1 and the second wiring layer 5 may move when the magnitude or direction of the current changes, thereby pushing a diaphragm 210 (shown in FIG. 11) connected to the first wiring layer 1 and the second wiring layer 5 to vibrate to produce sound.

In at least one embodiment, a thickness of the first wiring layer 1 is in a range from 0.1 μm to 200 μm, and a spacing of wirings of the first wiring layer 1 is in a range from 1.0 μm to 200 μm. In at least one embodiment, a thickness of the second wiring layer 5 is in a range from 0.1 μm to 200 μm, and a spacing of wirings of the second wiring layer 5 is in a range from 1.0 μm to 200 μm. The first wiring layer 1 and the second wiring layer 5 may be formed by etching, printing, chemical electroplating, or depositing. Therefore, the thickness and spacing of the wirings can be adjusted according to actual needs. Compared to the existing cylindrical coils, such as enamel wiring, each of the first wiring layer 1 and the second wiring layer 5 has a substantially two-dimensional planar structure with a smaller thickness and a smaller spacing. Such thickness can reduce the total thickness of the voice coil structure 100, and also allow the wirings of the first wiring layer 1 and the second wiring layer 5 to meet the impedance requirements. Such spacing can improve wiring densities of the first wiring layer 1 and the second wiring layer 5.

In at least one embodiment, the first wiring layer 1 and the second wiring layer 5 can be made of different conductive materials by different molding processes. The conductive materials can be, for example, metal, polymer conductive paste, conductive ink. In addition, the first wiring layer 1 and the second wiring layer 5 include the above conductive materials have good thermal conductivity, thereby providing the voice coil structure 100 with high heat dissipation.

In at least one embodiment, a thickness of the first insulating layer 9 is in a range from 0.1 μm to 200 μm. Such thickness is small, which can reduce the thickness of the voice coil structure 100. In at least one embodiment, the first insulating layer 9 can be made of a semiconductor material. In at least one embodiment, the first insulating layer 9 can be formed, for example, through chemical deposition or physical deposition. The first insulating layer 9 includes the semiconductor material has good dimensional stability, which can improve the dimensional stability of the voice coil structure 100.

In at least one embodiment, a thickness of the third insulating layer 7 is in a range from 0.1 μm to 200 μm. Such thickness is thin and can further reduce the thickness of the voice coil structure 100. In at least one embodiment, a material of the third insulating layer 7 can be, for example, insulating paint. The third insulating layer 7 is mainly used to protect internal wirings of the first wiring layer 1 and the second wiring layer 5.

In at least one embodiment, a thickness of the second insulating layer 3 can be set according to the thickness of the first and second wiring layers 1 and 5. The thickness of the second insulating layer 3 is in a range from 0.1 μm to 1000 μm. In at least one embodiment, the second insulating layer 3 can be made of epoxy resin, siloxane, polybenzoxazole (PBO), acrylic resin, build-up film, or prepreg. The second insulating layer 3 includes the above materials, and can be free of glass fiber. The second insulating layer 3 can improve the dimensional stability of the voice coil structure 100.

Figure 2:
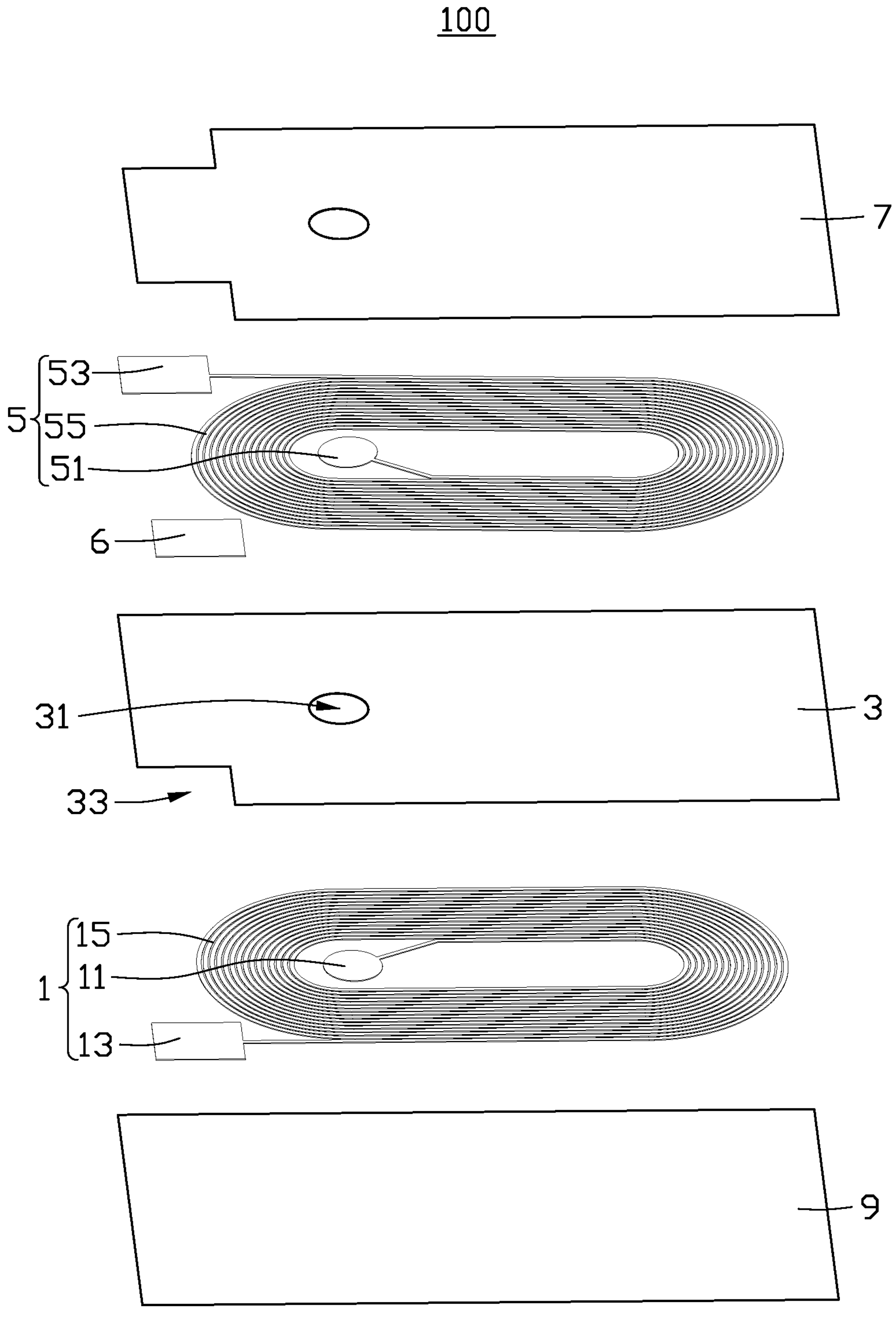
FIG. 2 is an exploded view of an embodiment of the voice coil structure shown in FIG. 1.

In at least one embodiment, referring to FIG. 2, the voice coil structure 100 includes only one second wiring layer 5. In another embodiment, referring to FIG. 3, the voice coil structure 100 includes two second wiring layers 5. It can be understood that the number of the second wiring layer(s) 5 is not limited, and may also be a number from three to eight, which can improve the power capacity that the voice coil structure 100 can withstand.

Figure 5:
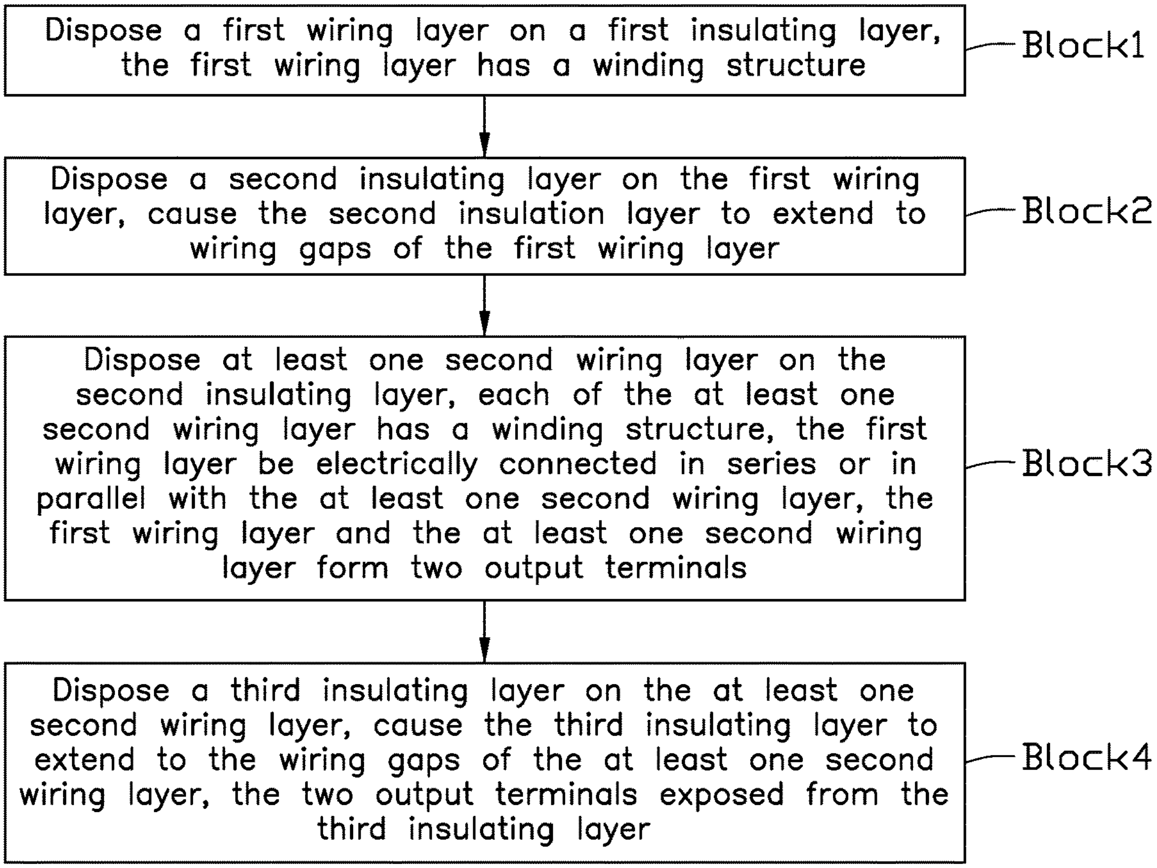
FIG. 5 is a flowchart illustrating a manufacturing method of a voice coil structure according to an embodiment of the present disclosure.

FIG. 5 illustrates a flowchart of a manufacturing method of a voice coil structure 100 in accordance with an embodiment. The method is provided by way of embodiments, as there are a variety of ways to carry out the method. Each block shown in FIG. 5 represents one or more processes, methods, or subroutines carried out in the method. Furthermore, the illustrated order of blocks can be changed. Additional blocks may be added or fewer blocks may be utilized, without departing from this disclosure. The method can begin at block 1.

Figure 6:
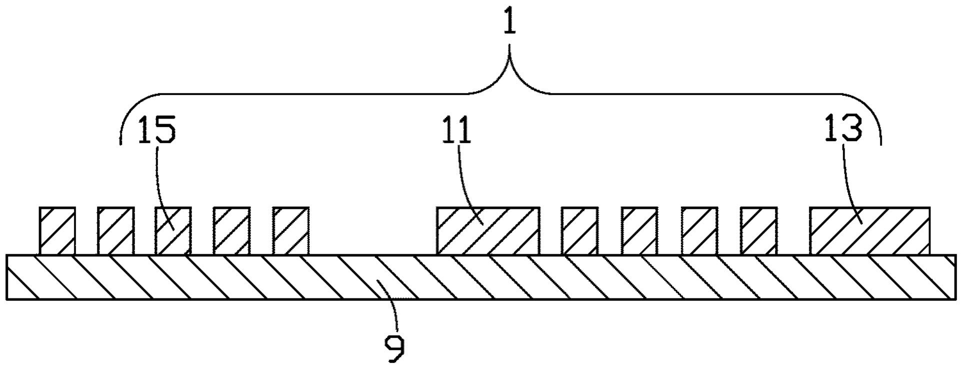
FIG. 6 is a cross-sectional view illustrating a first wiring layer being formed on a first insulating layer.

Block 1, referring to FIG. 6, a first wiring layer 1 is disposed on a first insulating layer 9, and the first wiring layer 1 has a first winding structure.

In at least one embodiment, the first wiring layer 1 may be formed by etching, printing, chemical electroplating, or depositing.

Figure 7:
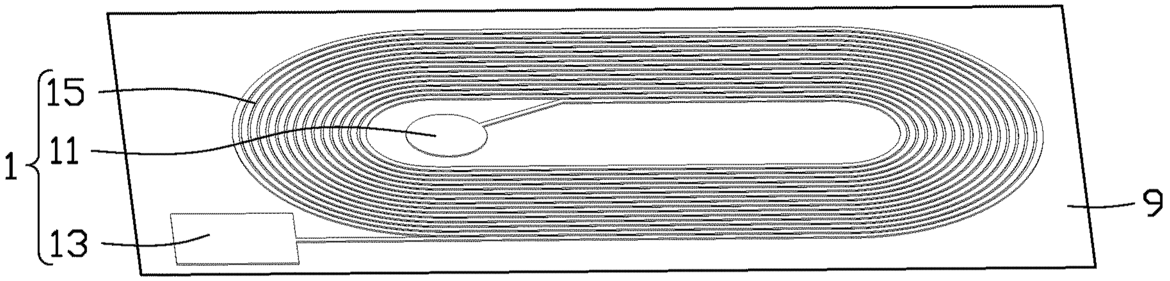
FIG. 7 is a diagrammatic view illustrating the first wiring layer and the first insulating layer in FIG. 6.

Referring to FIG. 7, the first wiring layer 1 is a coil that has a first winding structure. The whole coil is on a same plane. In at least one embodiment, the first wiring layer 1 includes a first end 11 and a second end 13. The first end 11 and the second end 13 are two free ends of the first wiring layer 1. The first end 11 is located in a middle area of the first wiring layer 1, and the second end 13 is located out of the first wiring layer 1. During manufacturing, a wiring is wound around the first end 11 as a starting end to form the first wiring layer 1, and the second end 13 is a terminal end. The first end 11 and the second end 13 are on a same plane.

Referring to FIG. 7, in at least one embodiment, the first wiring layer 1 further includes a first wiring portion 15 between the first end 11 and the second end 13. The first wiring portion 15 is wound around the first end 11 as a starting end to form a number of concentric circles. Adjacent two concentric circles are spaced from each other. The length of the first wiring portion 15 and the number of the concentric circles can be designed according to actual needs. The outline of the first wiring layer 1 is substantially circular. The outline of the first wiring layer 1 may also be square, hexagonal, or irregular polygonal. The shape of the first wiring layer 1 may be selected according to actual needs.

In at least one embodiment, the first wiring layer 1 can be printed on the surface of the first insulating layer 9 by printing conductive paste in a prescribed pattern. The printing method is simple and easy to implement, and can accurately control the width, the spacing, and the thickness of the first wiring layer 1, which is beneficial for thinning the wiring and achieving high density of the wirings.

In at least one embodiment, a thickness of the first wiring layer 1 is in a range from 0.1 μm to 200 μm, further in a range from 1 μm to 150 μm, further in a range from 5 μm to 100 μm, and further in a range from 10 μm to 50 μm. Compared to the existing cylindrical coils, such as enamel wiring, the first wiring layer 1 has a substantially two-dimensional planar structure with a smaller thickness and a smaller spacing. Such thickness can reduce the total thickness of the voice coil structure 100, and also allow the wirings of the first wiring layer 1 to meet the impedance requirements.

In at least one embodiment, a spacing of wirings of the first wiring layer 1 is in a range from 1.0 μm to 200 μm, further in a range from 1 μm to 150 μm, further in a range from 5 μm to 100 am, and further in a range from 10 μm to 50 μm. Such spacing can improve wiring densities of the first wiring layer 1, and can achieve a high-density design of the voice coil structure 100 to reduce the volume of the chip voice coil structure 100.

In at least one embodiment, before forming the first wiring layer 1, the manufacturing method further includes a step of forming the first insulating layer 9 in a mold. The first insulating layer 9 can be formed by chemical deposition or physical deposition with semiconductor material, such as silicon nitride or silicon dioxide.

In at least one embodiment, a thickness of the first insulating layer 9 is in a range from 0.1 μm to 200 μm, further in a range from 1 μm to 150 μm, further in a range from 5 μm to 100 μm, and further in a range from 10 μm to 50 μm. The thickness of the first insulating layer 9 formed by chemical deposition or physical deposition is thin. Such thin thickness can reduce the thickness of the voice coil structure 100.

In other embodiments, the first wiring layer 1 can be formed on the first insulating layer 9 by chemical plating to form a predetermined metal pattern. The chemical plating material can be copper, aluminum, silver, or gold. The chemical plating method can also accurately control the width, the spacing, and the thickness of the first wiring layer 1, which is beneficial for thinning and can achieve high density of the wirings. In addition, the first wiring layer 1 formed by chemical plating using the above metal materials has high thermal conductivity, which can improve the heat dissipation of the voice coil structure 100.

Figure 8:
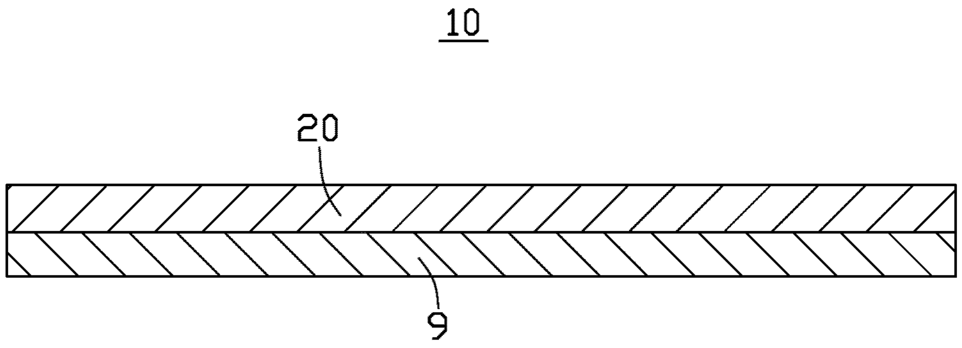
FIG. 8 is a cross-sectional view illustrating a copper-clad substrate for forming the structure in FIG. 6.

Referring to FIG. 8, in yet another embodiment, a copper-clad substrate 10 is first provided, which includes the first insulating layer 9 and a metal layer 20 on a surface of the first insulating layer 9. Referring to FIGS. 6 and 8, the first wiring layer 1 can be formed on the surface of the first insulating layer 9 by etching the metal layer 20. The etching may be chemical or physical etching, such as an exposure and development process. The etching method can also control the width, the spacing, and the thickness of the first wiring layer 1, which can improve the density of wirings.

Block 2, referring to FIG. 9, a second insulating layer 3 is disposed on the first wiring layer 1. The second insulation layer 3 extends to the wiring gaps of the first wiring layer 1.

In at least one embodiment, the second insulating layer 3 can be pressed on the surface of the first wiring layer 1, so that the first wiring layer 1 can be embedded in the second insulating layer 3, thereby further reducing the total thickness of the voice coil structure 100.

In at least one embodiment, the second insulating layer 3 includes a material selected from a group consisting of epoxy resin, siloxane, polybenzoxazole (PBO), acrylic resin, build-up film, prepreg, or any combination thereof. The second insulating layer 3 may also made of the above materials, and can be free of glass fiber. The second insulating layer 3 can improve the dimensional stability of the voice coil structure 100.

In at least one embodiment, a thickness of the second insulating layer 3 is in a range from 0.1 μm to 1000 μm, further in a range from 1 μm to 800 μm, further in a range from 5 μm to 500 μm, further in a range from 30 μm to 200 μm, and further in a range from 50 μm to 100 μm. The thickness of the second insulating layer 3 located in the middle can be flexibly designed according to the thickness of the first and second wiring layers 1 and 5, which cab meet the requirement of embedding the first wiring layer 1 within the second insulating layer 3. By controlling the thickness of the second insulating layer 3 within the above range, it is beneficial to further reduce the total thickness of the voice coil structure 100 while satisfying the requirements of different wiring and supporting functions.

Figure 4:
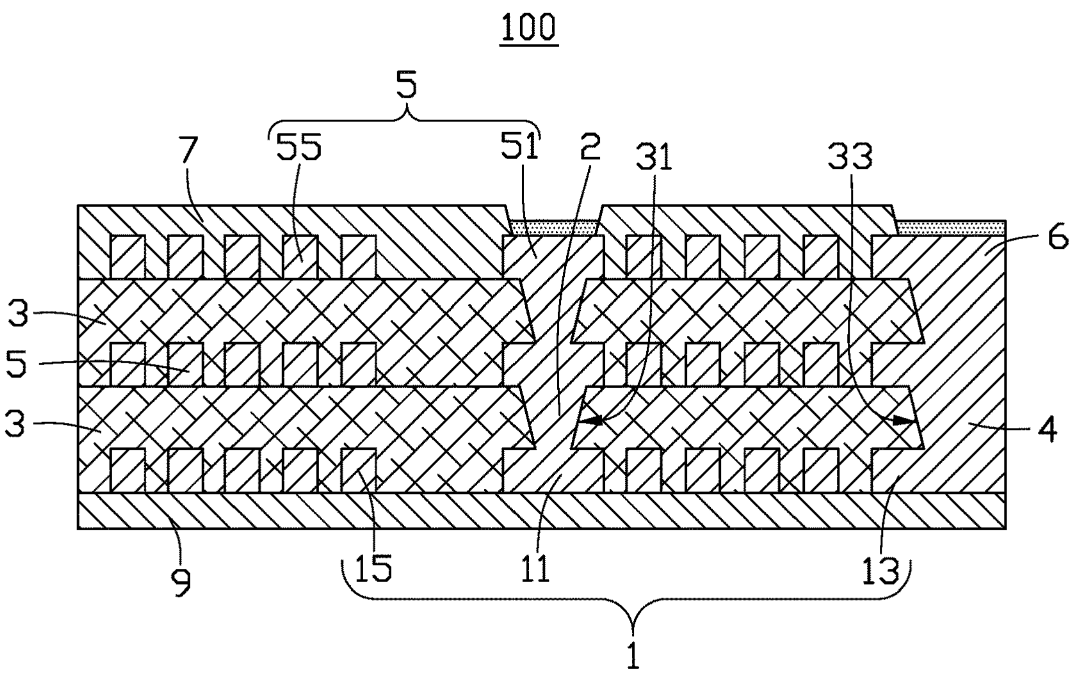
FIG. 4 is a cross-sectional view along line IV-IV shown in FIG. 1.

Block 3, referring to FIG. 4, at least one second wiring layer 5 is formed on the second insulating layer 3. The second wiring layer 5 has a second winding structure. The first wiring layer 1 is electrically connected in series or in parallel with the second wiring layer 5 and forming two output terminals.

In at least one embodiment, the second wiring layer 5 may be formed by etching, printing, chemical electroplating, or depositing.

Figure 3:
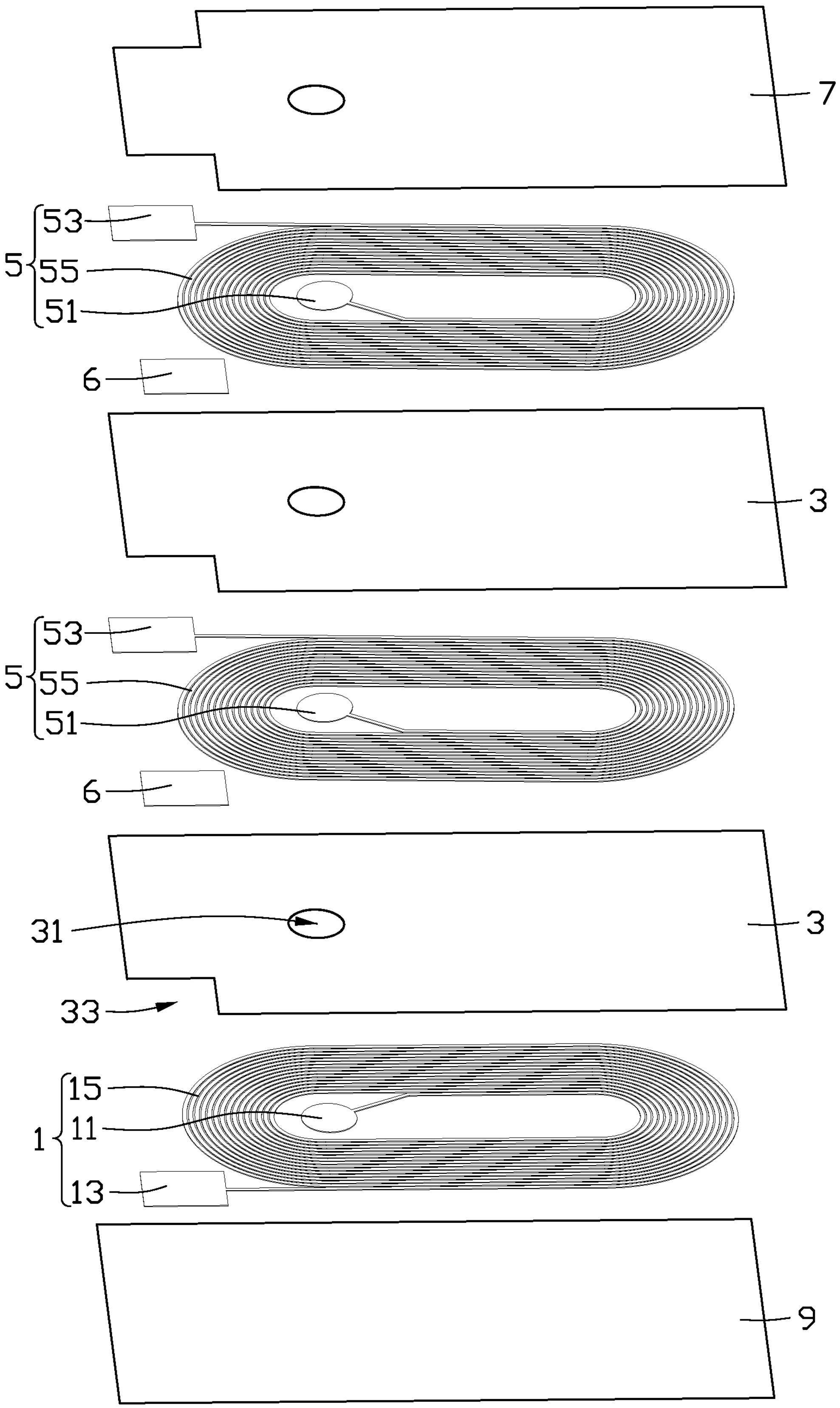
FIG. 3 is an exploded view of another embodiment of the voice coil structure shown in FIG. 1.

Referring to FIG. 3, the second wiring layer 5 is a coil that has a second winding structure. The whole coil is on a same plane. A plurality of stacked second wiring layers 5 are formed on the surface of the second insulating layer 3. The second wiring layers 5 and the first wiring layer 1 can be connected in series or in parallel, allowing for flexible design of the voice coil and forming a three-dimensional coil structure. The connected first wiring layer 1 and the second wiring layers 5 have two output terminals to connect to the positive pole and negative pole of the external power supply.

In at least one embodiment, the second wiring layer 5 includes a third end 51 and a fourth end 53. The third end 51 and the fourth end 53 are two free ends of the second wiring layer 5. The third end 51 is located in a middle area of the second wiring layer 5, and the fourth end 53 is located out of the second wiring layer 5. During manufacturing, a wiring is wound around the third end 51 as a starting end to form the second wiring layer 5, and the fourth end 53 is a terminal end. The third end 51 and the fourth end 53 are on a same plane.

Referring to FIG. 3, in at least one embodiment, the second wiring layer 5 further includes a second wiring portion 55 between the third end 51 and the fourth end 53. The second wiring portion 55 is wound around the third end 51 as a starting end to form a number of concentric circles. Adjacent two concentric circles are spaced from each other. The length of the second wiring portion 55 and the number of the concentric circles can be designed according to actual needs. The outline of the second wiring layer 5 is substantially circular. The outline of the second wiring layer 5 may also be square, hexagonal, or irregular polygonal. The shape of the second wiring layer 5 may be selected according to actual needs.

In at least one embodiment, when the first wiring layer 1 is connected in series with the second wiring layer 5, the third end 51 is electrically connected to the first 11 to form a detection terminal, which is used to detect whether the connection between the first wiring layer 1 and the second wiring layer 5 is successful. The fourth end 53 forms one output terminal, and the second end 13 forms another output terminal. The output terminals are used to connect to the positive pole and negative pole of the external power supply respectively.

In at least one embodiment, a thickness of the second wiring layer 5 is in a range from 0.1 μm to 200 μm, further in a range from 1 μm to 150 μm, further in a range from 5 μm to 100 μm, and further in a range from 10 μm to 50 μm. Compared to the existing cylindrical coils, such as enamel wiring, the second wiring layer 5 has a substantially two-dimensional planar structure with a smaller thickness and a smaller spacing. Such thickness can reduce the total thickness of the voice coil structure 100, and also allow the wirings of the second wiring layer 5 to meet the impedance requirements.

In at least one embodiment, a spacing of wirings of the second wiring layer 5 is in a range from 1.0 μm to 200 μm, further in a range from 1 μm to 150 μm, further in a range from 5 μm to 100 m, and further in a range from 10 μm to 50 μm. Such spacing can improve wiring densities of the second wiring layer 5, and can achieve a high-density design of the voice coil structure 100 to reduce the volume of the chip voice coil structure 100.

FIG. 10 illustrates a sub-flowchart of block 3 of FIG. 5, which shows how to dispose the second wiring layer 5 on the second insulating layer 3 in accordance with an embodiment. The method is provided by way of embodiments, as there are a variety of ways to carry out the method. Each block shown in FIG. 10 represents one or more processes, methods, or subroutines carried out in the method. Furthermore, the illustrated order of blocks can be changed. Additional blocks may be added or fewer blocks may be utilized, without departing from this disclosure. The method can begin at block 31.

Block 31, referring to FIG. 9, a through hole 31 and a notch 33 are defined on the second insulation layer 3. The first end 11 is exposed from the second insulation layer 3 through the through hole 31, and the second end 13 is exposed from the second insulation layer 3 through the notch 33.

In at least one embodiment, the through hole 31 and the notch 33 can be formed by chemical etching, laser drilling, or mechanical drilling.

Block 32, referring to FIG. 9, a first conductor 2 is disposed in the through hole 31 and a second conductor 4 is disposed in the notch 33. The first conductor 2 is electrically connected to the first end 11, and the second conductor 4 is electrically connected to the second end 13.

In at least one embodiment, the first conductor 2 and the second conductor 4 may be formed by chemical plating or deposition.

Block 33, referring to FIG. 4, the second wiring layer 5 and a connection pad 6 isolated from the second wiring layer 5 are disposed on the surface of the second insulating layer 3. The third end 51 is electrically connected to the first conductor 2 to form the detection end, the connection pad 6 is electrically connected to the second conductor 4 to form one output terminal, and the fourth end 53 forms another output terminal.

In at least one embodiment, when it is necessary to form multiple second wiring layers 5 on the second insulating layer 3, the manufacturing method of each second conductive layer 5 is basically the same. A second insulating layer 3 is located between two adjacent second wiring layers 5. The thickness of each second insulating layer 3 can be designed according to the thickness of the second wiring layer 5 to embed the second wiring layer 5 in the corresponding second insulating layer 3. Such thickness of each second insulating layer 3 is beneficial to further reduce the thickness of the voice coil structure 100.

Block 4, referring to FIGS. 1 to 4, the third insulating layer 7 is disposed on the surface of the second wiring layer 5. The third insulating layer 7 extends to the wiring gaps of the second wiring layer 5. The two output terminals are exposed from the third insulating layer 7. Then the voice coil structure 100 is obtained.

The third insulating layer 7 is mainly used to protect the second wiring layer 5. The material of the third insulating layer 7 may be insulating paint. In addition, the third end 51 is stacked and electrically connected to the first end 11 of the first wiring layer 1, and the third end 51 is exposed as a detection terminal from the third insulating layer 7. Such detection terminal can facilitate the detection of the internal coil. The connection pad 6 is electrically connected to the second end 13 of the first wiring layer 1 and exposed from the third insulating layer 7 to form one of the two output terminals. The fourth end 53 is exposed from the third insulating layer 7 to form another of the two output terminals. The two output terminals facilitate the wires in the voice coil structure 100 to respectively connect to the positive and negative terminals of the external power supply.

In at least one embodiment, each of the third end 51, the connection pad 6, and the fourth end 53 has a structure like a solder pad.

In the present disclosure, the thickness of the first insulating layer 9 is small, which can reduce the total thickness of the voice coil structure 100. The thickness of the first wiring layer 1 and the second wiring layer 5 can be adjusted, thereby achieving ultra-thin packaging, which is beneficial to miniaturization of the voice coil structure 100.

Furthermore, the wiring density of each of the first wiring layer 1 and the second wiring layer 5 is high. The width, spacing, and shape of the wire can be designed according to actual needs. The first wiring layer 1 is embedded in the first insulating layer 3, which can further reduce the thickness of the voice coil structure 100.

Furthermore, the first wiring layer 1 and the multi-layers of the second wiring layer 5 can series connect or parallel connect with each other, which can improve the connection flexibility of the wires.

Furthermore, the third end 51, the connection pad 6, and the fourth end 53 are exposed from a same side of the third insulation layer 7. As such, the soldering process is facilitated when the positive and negative terminals of the external power supply are respectively connected to the connection pad 6 and the fourth end 53 by soldering. And also, the soldering process is facilitated when the third end 51 is connected to the detection circuit.

Furthermore, the first insulating layer 9 is made of semiconductor material, which has good dimensional stability to improve the dimensional stability of the voice coil structure 100. The materials of the second insulating layer 3 and the third insulating layer 7 do not contain glass fiber, which can further improve the dimensional stability of the voice coil structure 100. The first wiring layer 1 and the second wiring layer 5 have good thermal conductivity, which enables the voice coil structure 100 to have high heat dissipation.

Furthermore, the manufacturing method of the voice coil structure 100 can realize at least one of the planar winding, cyclic winding, or 3D stereoscopic winding of the wires, and the connection between coils is flexible. The voice coil structure 100 is stable and durable, with simple structures for the first wiring layer 1 and the second wiring layer 5, which can pass the moisture sensitivity test level 1 (MSL1) and have high reliability. In addition, the voice coil structure 100 can withstand a high power over 300 mW, which is more than three times higher than the enamel wire voice coils.

In order to further illustrate the higher power bearing capacity of the voice coil structure 100, the voice coil structure 100 provided in a loudspeaker with a thickness of 6 mm. While an existing voice coil structure made of enamel wire is also applied to the same loudspeaker. The service life test of the loudspeakers is conducted. The test results of the loudspeaker with the existing voice coil are shown in Table 1. The frequency test curve of the loudspeaker provided by the present disclosure is shown in FIG. 11.

TABLE 1

| | Power/mW | | | | | | |
|---|---|---|---|---|---|---|---|
| samples | 10 | 15 | 20 | 25 | . . . | 65 | 70 |
| 1 | OK | OK | OK | OK | OK | OK | NG |
| 2 | OK | OK | OK | OK | OK | OK | NG |

Figure 11:
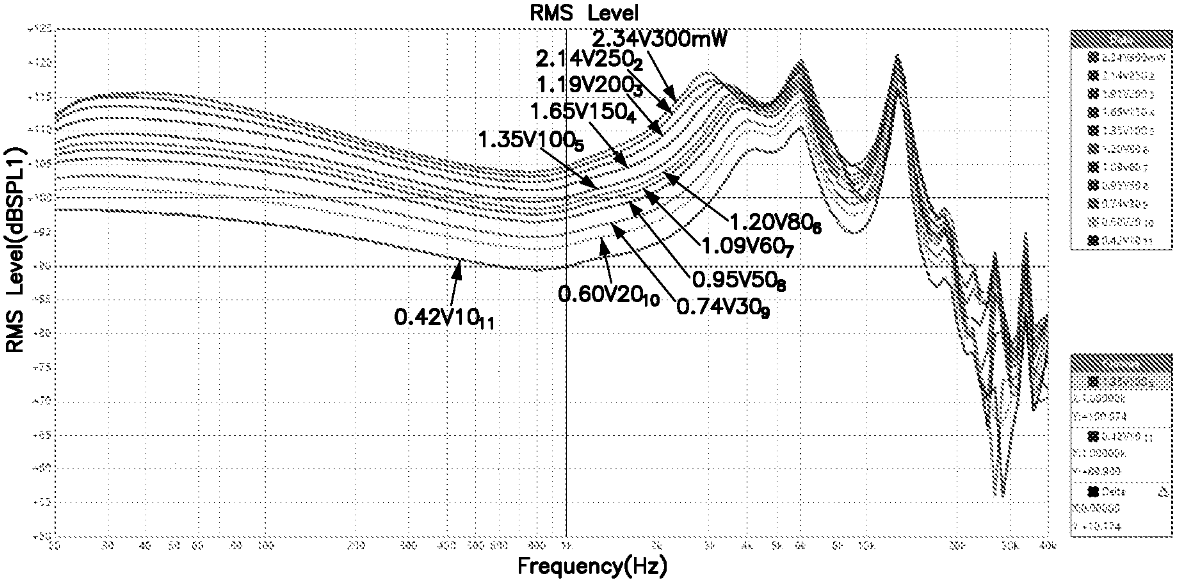
FIG. 11 is a frequency test curve illustrating a loudspeaker having the voice coil structure in FIG. 1.

As shown in Table 1 and FIG. 11, the loudspeaker prepared using the voice coil structure provided by the present disclosure has a stable test curve when verified at power levels ranging from 10 mW to 300 mW and sensitivity ranging from 90 dB to 105 dB at 1 KHz. The loudspeaker by the present disclosure can withstand a power of over 300 mW. However, the loudspeaker with an enamel wire voice coil in the prior art cannot withstand a power of above 70 mW. Therefore, the loudspeaker with the voice coil structure 100 provided by the present disclosure can effectively improve the power tolerance of the loudspeaker, which is more than three times higher than the loudspeaker with the existing voice coil.

Figure 12:
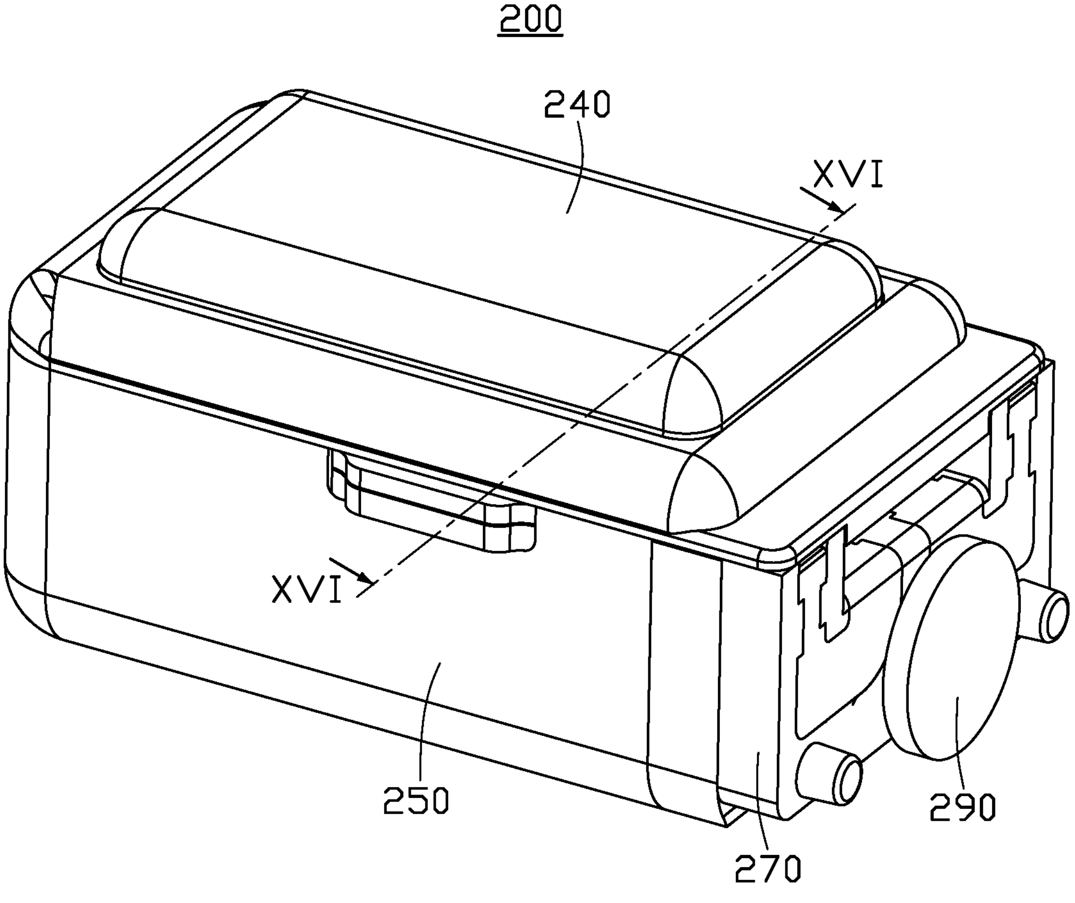
FIG. 12 is a diagrammatic view illustrating a loudspeaker according to an embodiment of the present disclosure.
Figure 13:
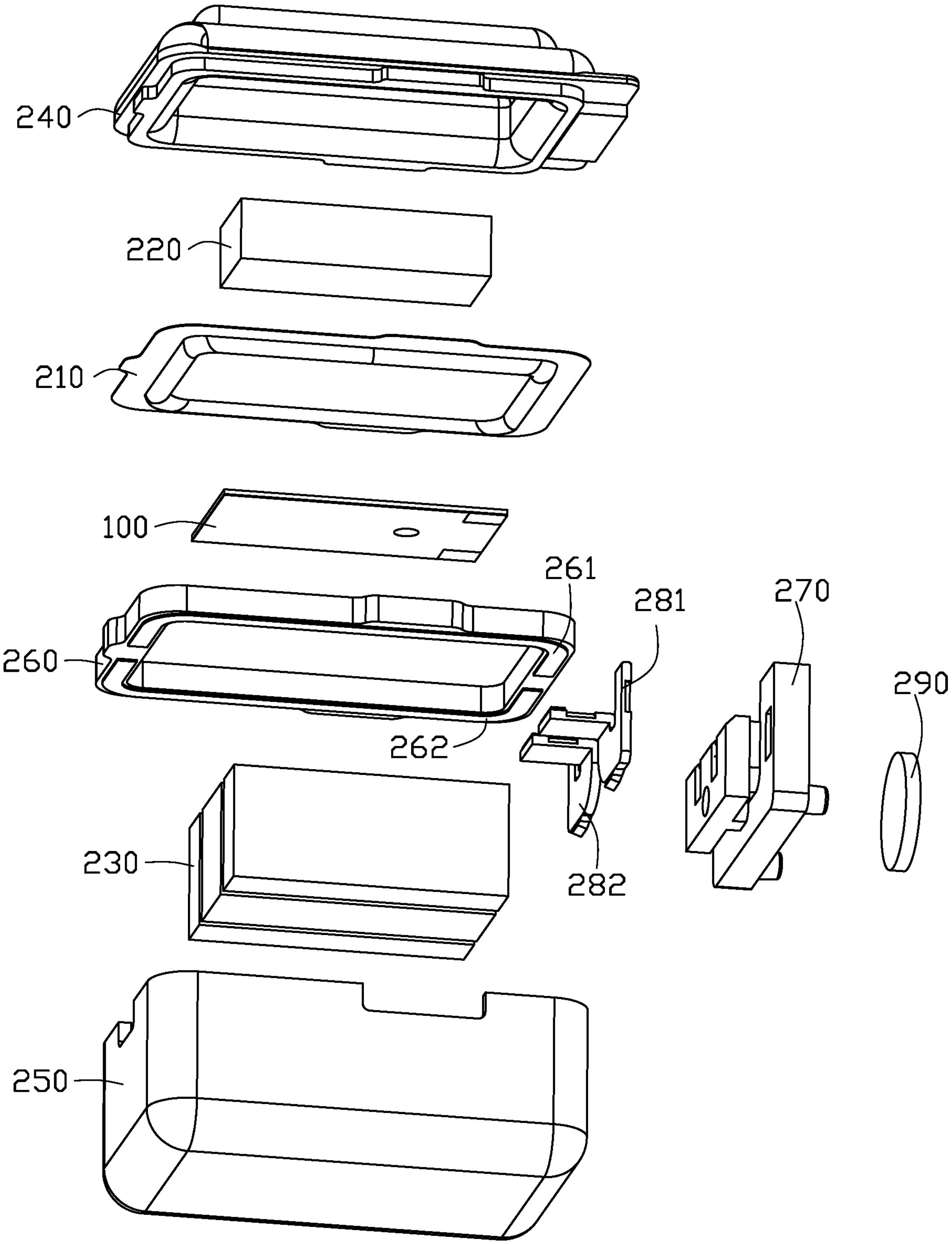
FIG. 13 is an exploded view illustrating the loudspeaker in FIG. 12.
Figure 14:
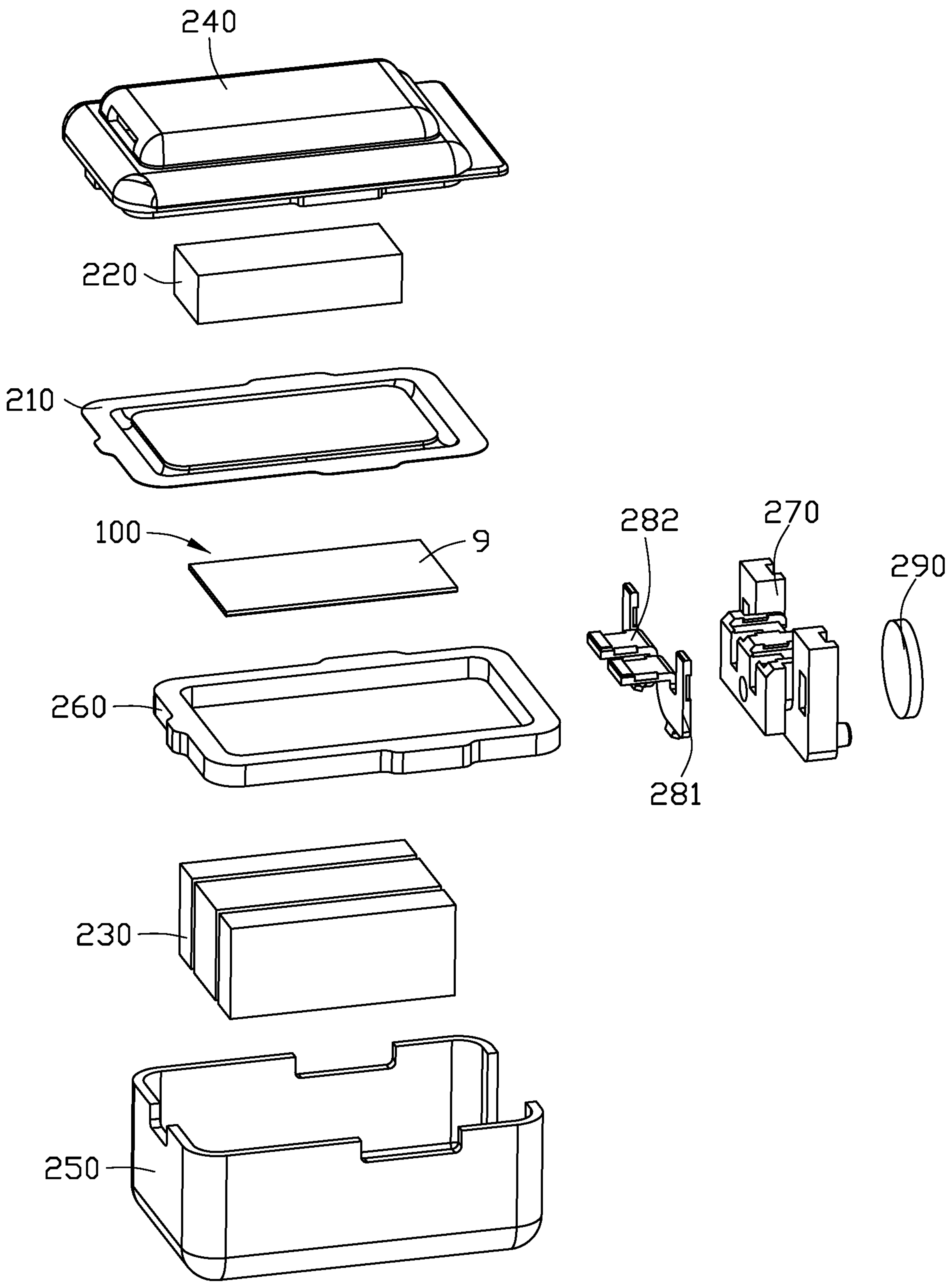
FIG. 14 is an exploded view illustrating the loudspeaker in FIG. 13 from another angle.

Referring to FIGS. 12 to 14, a loudspeaker 200 is further provided according to an embodiment of the present disclosure. The loudspeaker 200 includes the diaphragm 210, the voice coil structure 100, a first magnetic member 220, and a second magnetic member 230. The first magnetic member 220 and the second magnetic member 230 are disposed on two sides of the voice coil structure 100.

The voice coil structure 100 has multiple layers of wires. A surface of the first wiring layer 1 away from the surface of the second wiring layer 5 is disposed on the diaphragm 210. In at least one embodiment, the first wiring layer 1 is not directly disposed on the diaphragm 210. A surface of the first insulating layer 9 away from the first wiring layer 1 is disposed on the diaphragm 210. An adhesive layer (not shown) may also be arranged between the diaphragm 210 and the first insulating layer 9, and the diaphragm 210 and the first insulating layer 9 may be connected through the adhesive layer. Each wiring layer in the voice coil structure 100 can produce a magnetic field after being energized, and the energized wiring layer can vibrate under the function of the first magnetic member 220 and the second magnetic member 230. The wiring layer then drives the diaphragm 210 to vibrate, thereby generating sound.

Figure 15:
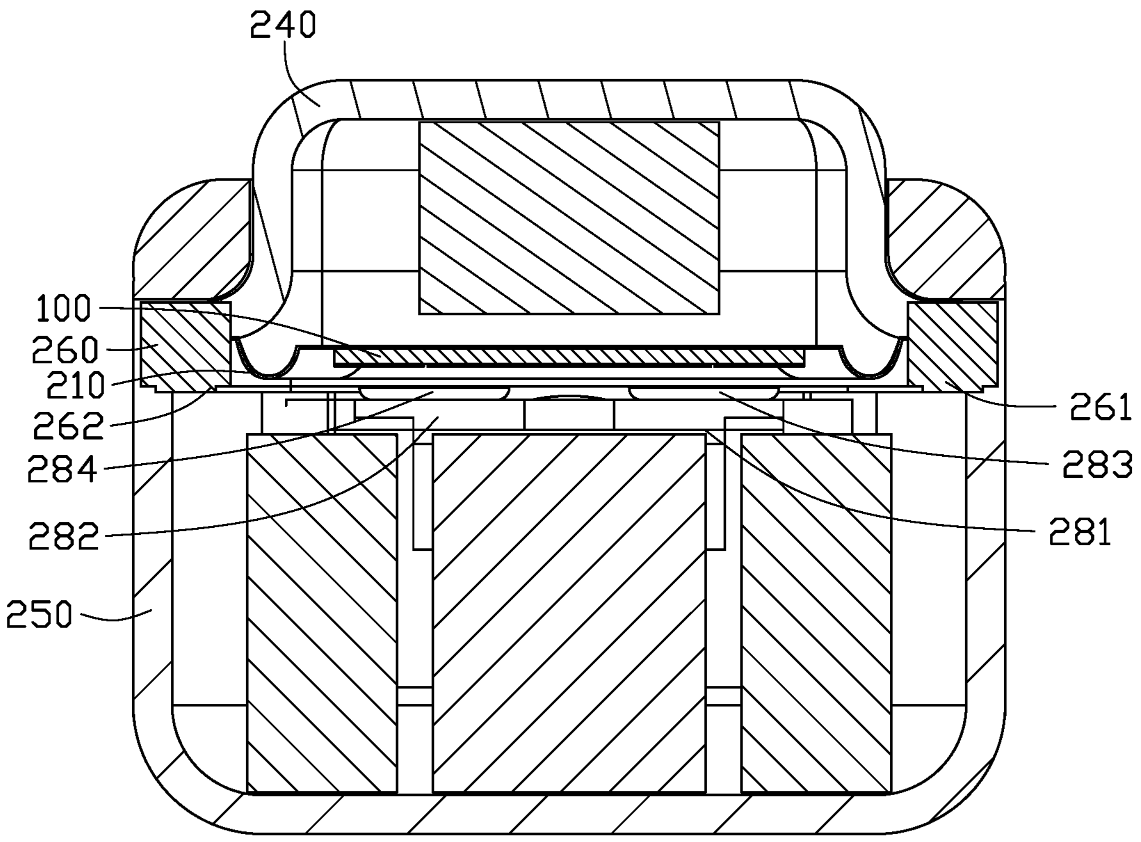
FIG. 15 is a cross-sectional view along line XV-XV shown in FIG. 12.

Referring to FIGS. 13 to 15, in at least one embodiment, the loudspeaker 200 further includes a first housing 240, a second housing 250, a support frame 260, a fixing base 270, a first conductive sheet 281, and a second conductive sheet 282. The first housing 240 and the second housing 250 are connected to each other such as by a clamping manner. The diaphragm 210, the first magnetic member 220, the second magnetic member 230, the voice coil structure 100, and the support frame 260 are all received in a space defined by the first housing 240 and the second housing 250. The first magnetic member 220 is fixed in the first housing 240. For example, the first magnetic member 220 may be glued to the inner surface of the first housing 240. The first magnetic member 220 may also be embedded into the wall of the first housing 240. The second magnetic member 230 is fixed in of the second housing 250. For example, the second magnetic member 230 may be glued to the inner surface of the second housing 250. The second magnetic member 230 may also be embedded into the wall of the second housing 250. The support frame 260 is fixed on an inner wall of the first housing 240. The support frame 260 is further fixed to an edge of diaphragm 210 such as by gluing. As such, the diaphragm 210 is fixed to the first housing 240 through the support frame 260. The support frame 260 is substantially square. The support frame 260 may be a plate made of flexible plastic. In at least one embodiment, each of the first magnetic member 220 and the second magnetic member 230 may include one or more magnets.

Figure 16:
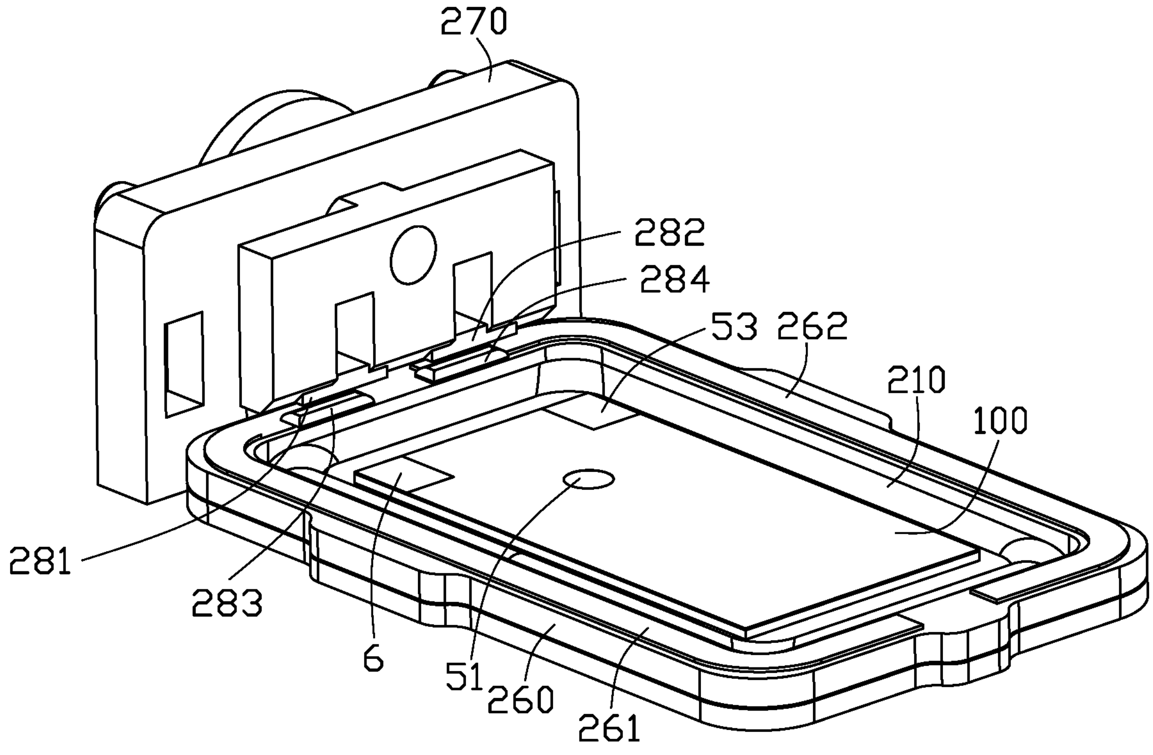
FIG. 16 is a diagrammatic view illustrating a support frame and a fixing base of the loudspeaker in FIG. 15.

Referring to FIGS. 13, 15, and 16, the diaphragm 210 and the voice coil structure 100 are located in a hollow cavity of the support frame 260. The diaphragm 210 and the voice coil structure 100 both vibrate in the hollow cavity of the support frame 260. In at least one embodiment, the support frame 260 is provided with a first conductive adhesive 261 and a second conductive adhesive 262. The first conductive adhesive 261 and the second conductive adhesive 262 are not connected but spaced from each other. The first conductive segment 261 and the second conductive segment 262 are located on a same surface of the support frame 260. The first conductive adhesive 261 is electrically connected to the connection pad 6 of the voice coil structure 100, and the second conductive adhesive 262 is electrically connected to the fourth end 53 of the voice coil structure 100.

Figure 17:
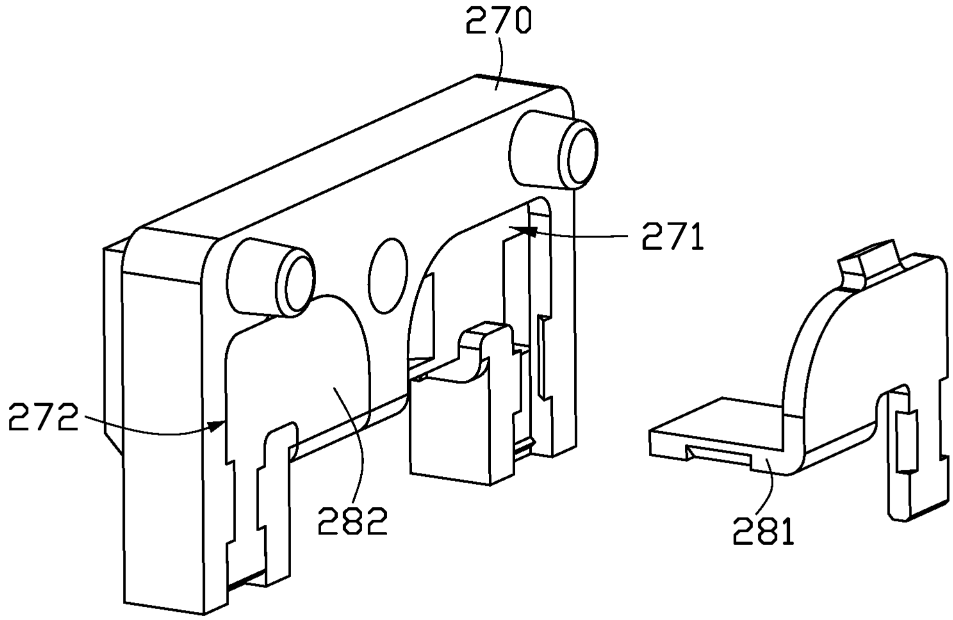
FIG. 17 is an exploded view illustrating the fixing base in FIG. 16 from another angle.

Referring to FIGS. 16 and 17, when the first housing 240 and the second housing 250 are connected to each other, the fixing base 270 is disposed on a side of the first housing 240 and the second housing 250. The fixing base 270 may be connected to the first housing 240 and the second housing 250 such as by gluing or screwing. The first conductive sheet 281 and the first conductive sheet 281 are both mounted on the fixing base 270. In at least one embodiment, the fixing base 270 defines a first mounting groove 271 and a second mounting groove 272. The first mounting groove 271 and the second mounting groove 272 may have a same structure and are located on a surface of the fixing base 270 away from the first housing 240. The first conductive sheet 281 is received in the first mounting groove 271 and exposed from the surface of the fixing base 270. One end of the first conductive sheet 281 extends through the fixing base 270, and is located on and connected to the first conductive adhesive 261. The second conductive sheet 282 is received in the second mounting groove 272 and exposed from the surface of the fixing base 270. One end of the second conductive sheet 282 extends through the fixing base 270, and is located on and connected to the second conductive adhesive 262. The first conductive sheet 281 is electrically connected to the positive terminal of the external power supply. The first conductive sheet 281 is further electrically connected to the connection pad 6 of the voice coil structure 100 through the first conductive adhesive 261. The second conductive sheet 282 is electrically connected to the negative terminal of the external power supply. The second conductive sheet 282 is further electrically connected to the fourth end 53 of the voice coil structure 100 through the second conductive adhesive 262. Thus, the output terminal (or wiring ends) of the voice coil structure 100 is introduced outside of the loudspeaker 200 through the first conductive sheet 281 and the second conductive sheet 282, thereby facilitating the connection between the loudspeaker 200 and the external power supply.

Referring to FIGS. 16 and 17, in at least one embodiment, a first solder disc 283 is provided between the first conductive adhesive 261 and the first conductive sheet 281. A second solder disc 284 is provided between the second conductive adhesive 262 and the second conductive sheet 282. The first solder disc 283 electrically connects the first conductive sheet 281 to the first conductive adhesive 261. The second solder disc 284 electrically connects the second conductive sheet 282 to the second conductive adhesive 262.

In at least one embodiment, a tuning mesh 290 is further fixed on the fixing base 270 such as by gluing.

With the above configuration, the voice coil structure 100 provided by the present disclosure can replace the existing cylindrical voice coils. The voice coil structure 100 has universality, which can be combined with an existing diaphragm without the need to change the structure of the diaphragm. The size occupied by the voice coil structure 100 in the loudspeaker 200 is reduced, which is conducive to the miniaturization of the loudspeaker 200.

In addition, compared with the existing cylindrical voice coils, the voice coil structure 100 provided by the present application is thinner and has a larger surface area. Thus, the gluing area of the voice coil structure 100 is increased, thereby improving the stability of the voice coil structure 100 installed on the diaphragm 210 and preventing the voice coil structure 100 from separating from the diaphragm 210.

Even though information and advantages of the present embodiments have been set forth in the foregoing description, together with details of the structures and functions of the present embodiments, the present disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A manufacturing method of a voice coil structure, comprising:

forming a first insulation layer by chemical deposition or physical deposition in a mold;

disposing a first wiring layer on the first insulation layer, the first wiring layer having a first winding structure;

disposing a second insulating layer on the first wiring layer, causing the second insulating layer to extend into wiring gaps of the first wiring layer;

disposing at least one second wiring layer on the second insulating layer, each of the at least one second wiring layer having a second winding structure, the first wiring layer being electrically connected in series or in parallel with the at least one second wiring layer, the first wiring layer and the at least one second wiring layer forming two output terminals; and disposing a third insulating layer on the at least one second wiring layer, causing the third insulating layer to extend into wiring gaps of the at least one second wiring layer, and the two output terminals exposed from the third insulating layer.

2. The manufacturing method of claim 1, wherein the first wiring layer is formed by etching, printing, chemical electroplating, or depositing, and each of the at least one second wiring layer is formed by etching, printing, chemical electroplating, or depositing.

3. The manufacturing method of claim 1, wherein the first wiring layer is provided with a first end and a second end and formed by winding a wiring around the first end as a starting end, and the second end is a terminal end, the first end and the second end are on a same plane, each of the at least one second wiring layer is provided with a third end and a fourth end and formed by winding a wiring around the third end as a starting end, and the fourth end is a terminal end, the third end and the fourth end are on a same plane, and the first wiring layer is electrically connected in series with the at least one second wiring layer, the third end is electrically connected to the first end, the third end is exposed from the third insulating layer to form a detection terminal, the fourth end and the second end are exposed from the third insulating layer to form the two output terminals.

4. The manufacturing method of claim 3, wherein disposing the at least one second wiring layer on the second insulating layer comprises:

defining a through hole and a notch on the second insulation layer, the first end being exposed from the through hole, and the second end being exposed from the notch;

disposing a first conductor in the through hole and disposing a second conductor in the notch, the first conductor being electrically connected to the first end, and the second conductor being electrically connected to the second end; and disposing the at least one second wiring layer and a connection pad isolated from the at least one second wiring layer on the second insulating layer, wherein the third end is electrically connected to the first conductor to form the detection end, the connection pad is electrically connected to the second conductor to form one of the two output terminals, and the fourth end forms another one of the two output terminals.

5. The manufacturing method of claim 1, wherein a thickness of the first insulating layer is in a range from 0.1 μm to 200 μm, a thickness of the third insulating layer is in a range from 0.1 μm to 200 μm, a thickness of the second insulating layer is in a range from 0.1 μm to 1000 μm, a thickness of the first wiring layer is in a range from 0.1 μm to 200 μm, and a spacing of wirings of the first wiring layer is in a range from 1.0 μm to 200 μm, and a thickness of the at least one second wiring layer is in a range from 0.1 μm to 200 μm, and a spacing of wirings of the at least one second wiring layer is in a range from 1.0 μm to 200 μm.

6. A voice coil structure comprising:

a first insulation layer;

a first wiring layer disposed on the first insulation layer and having a first winding structure;

a second insulation layer disposed on the first wiring layer and extending to wiring gaps of the first wiring layer, the first wiring layer embed in the second insulating layer;

at least one second wiring layer disposed on the second insulation layer and having a second winding structure; and a third insulation layer disposed on the at least one second wiring layer and extending to wiring gaps of the at least one second wiring layer, the at least one second wiring layer embed in the third insulating layer, wherein the first wiring layer is electrically connected in series or in parallel with the at least one second wiring layer, the first wiring layer and the at least one second wiring layer form two output terminals, the two output terminals are exposed from the third insulating layer, a thickness of the first insulating layer is in a range from 0.1 μm to 200 μm, a thickness of the third insulating layer is in a range from 0.1 μm to 200 μm, a thickness of the second insulating layer is in a range from 0.1 μm to 1000 μm.

7. The voice coil structure of claim 6, wherein a thickness of the first wiring layer is in a range from 0.1 μm to 200 μm, and a spacing of wirings of the first wiring layer is in a range from 1.0 μm to 200 μm.

8. The voice coil structure of claim 6, wherein a thickness of the at least one second wiring layer is in a range from 0.1 μm to 200 μm, and a spacing of wirings of the at least one second wiring layer is in a range from 1.0 μm to 200 μm.

9. The voice coil structure of claim 6, further comprising a plurality of second wiring layers, including the at least one second wiring layer, sequentially stacked on the second insulating layer, wherein the second insulating layer is disposed between two adjacent of the plurality of second wiring layers, and the plurality of second wiring layers is connected in series or in parallel with the first wiring layer.

10. The voice coil structure of claim 6, wherein the first wiring layer comprises metal, polymer conductive paste, or conductive ink, and the at least one second wiring layer comprises metal, polymer conductive paste, or conductive ink.

11. The voice coil structure of claim 6, wherein the first insulating layer comprises a semiconductor material, the second insulating layer comprises a material selected from a group consisting of epoxy resin, siloxane, polybenzoxazole, acrylic resin, build-up film, prepreg, or any combination thereof, and the second insulating layer is free of glass fiber.

12. A loudspeaker comprising:

a diaphragm; and a voice coil structure comprising:

a first insulation layer;

a first wiring layer disposed on the first insulation layer and having a first winding structure;

a second insulation layer disposed on the first wiring layer and extending to wiring gaps of the first wiring layer, the first wiring layer embed in the second insulating layer;

at least one second wiring layer disposed on the second insulation layer and having a second winding structure; and a third insulation layer disposed on the at least one second wiring layer and extending to wiring gaps of the at least one second wiring layer to make the at least one second wiring layer embed in the third insulating layer, wherein the first wiring layer is electrically connected in series or in parallel with the at least one second wiring layer, the first wiring layer and the at least one second wiring layer form two output terminals, the two output terminals are exposed from the third insulating layer, a surface of the first insulation layer away from the first wiring layer disposed on the diaphragm;

the loudspeaker further comprising a support frame, a first conductive adhesive, and a second conductive adhesive, wherein the diaphragm is disposed on the support frame, the first conductive adhesive and the second conductive adhesive are disposed on a surface of the support frame, the first conductive adhesive is electrically connected to one of the two output terminals, and the second conductive adhesive is electrically connected to another one of the two output terminals.

13. The loudspeaker of claim 12, wherein a thickness of the first insulating layer is in a range from 0.1 μm to 200 μm, a thickness of the third insulating layer is in a range from 0.1 μm to 200 μm, a thickness of the second insulating layer is in a range from 0.1 μm to 1000 μm.

14. The loudspeaker of claim 12, wherein a thickness of the first wiring layer is in a range from 0.1 μm to 200 μm, and a spacing of wirings of the first wiring layer is in a range from 1.0 μm to 200 μm, and a thickness of the at least one second wiring layer is in a range from 0.1 μm to 200 μm, and a spacing of wirings of the at least one second wiring layer is in a range from 1.0 μm to 200 μm.

15. The loudspeaker of claim 12, wherein the voice coil structure further comprises a plurality of second wiring layers, including the at least one second wiring layer, sequentially stacked on the second insulating layer, second insulating layer is disposed between two adjacent of the plurality of second wiring layers, and the plurality of second wiring layers is connected in series or in parallel with the first wiring layer.

16. The loudspeaker of claim 12, wherein the first wiring layer comprises metal, polymer conductive paste, or conductive ink, and the at least one second wiring layer comprises metal, polymer conductive paste, or conductive ink.

17. The loudspeaker of claim 12, wherein the first insulating layer comprises a semiconductor material, the second insulating layer comprises a material selected from a group consisting of epoxy resin, siloxane, polybenzoxazole, acrylic resin, build-up film, prepreg, or any combination thereof, and the material of the second insulating layer is free of glass fiber.

* * * * *